United States Patent [19]

Baxi

[11] 4,303,474
[45] Dec. 1, 1981

[54] NUCLEAR REACTOR CORE ASSEMBLY

[75] Inventor: Chandrakant B. Baxi, Encinitas, Calif.

[73] Assignee: General Atomic Company, San Diego, Calif.

[21] Appl. No.: 906,732

[22] Filed: May 17, 1978

Related U.S. Application Data

[63] Continuation-in-part of Ser. No. 773,141, Mar. 1, 1977, abandoned.

[51] Int. Cl.³ ............................................. G21C 15/00
[52] U.S. Cl. .................................... 376/175; 376/454; 376/352
[58] Field of Search ....................... 176/50, 43, 61, 87, 176/17, 18, 40, 81, 78

[56] References Cited

U.S. PATENT DOCUMENTS

| | | | |
|---|---|---|---|
| 2,906,683 | 9/1959 | Quackenbush | 176/81 |
| 3,034,975 | 5/1962 | Beurtheret | 176/81 |
| 3,158,543 | 11/1964 | Sherman et al. | 176/50 |
| 3,284,310 | 11/1966 | Straat | 176/61 |
| 3,475,272 | 10/1969 | Fortescue et al. | 176/40 |
| 3,486,973 | 12/1969 | Georges et al. | 176/43 |
| 3,873,419 | 3/1975 | Sletten | 176/61 |
| 3,878,870 | 4/1975 | Atherton et al. | 176/61 |
| 3,892,625 | 7/1975 | Patterson | 176/50 |

OTHER PUBLICATIONS

Nuclear Technology, vol. 33, 3/77, pp. 314-317, by Rehme.
"Mechanics of Fluid", McGraw-Hill Book Co. Inc., 1962, p. 257, Shames.
"Tool Engineers Handbook", McGraw-Hill Book Co. Inc., 1949, pp. 1330-1337, Williamson.
"Fluid Mechanics", Wiley & Sons Inc. 1967, Hansen, pp. 418-427, FIG. 11.2.

Primary Examiner—Harvey E. Behrend
Attorney, Agent, or Firm—Fitch, Even, Tabin, Flannery & Welsh

[57] ABSTRACT

A nuclear reactor core assembly is described in which a plurality of fuel elements and a plurality of blanket elements are arranged in a core assembly. Conduit means direct fluid coolant through the fuel elements and through the blanket elements. The conduit means which direct the coolant through the blanket elements have flow restrictor means therein comprising a plurality of surface roughened elements for limiting the flow of coolant through the blanket elements. The flow restrictor means have a static configuration such that at shutdown, the percentage of coolant flow through the blanket elements compared with the total coolant flow is substantially greater than the percentage of coolant flow through the blanket elements during full power operation.

6 Claims, 9 Drawing Figures

FIG. 2
FIG. 3
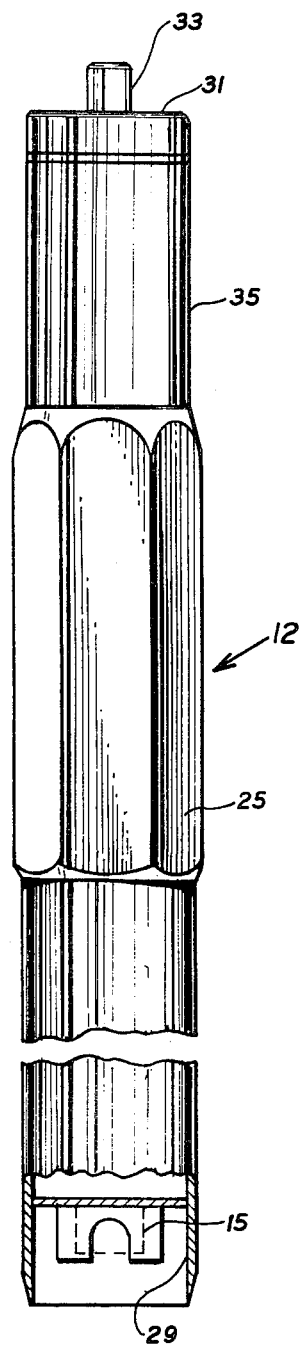
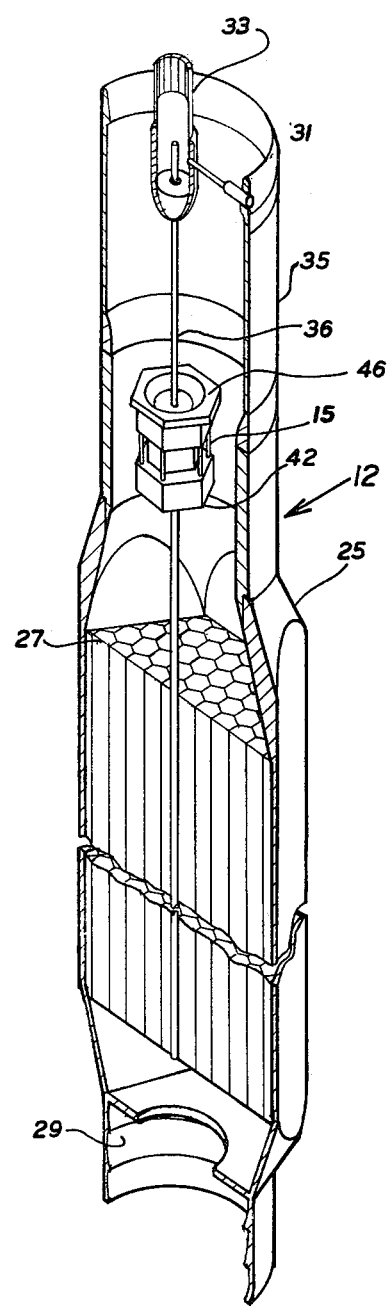

NUCLEAR REACTOR CORE ASSEMBLY

This application is a continuation-in-part of application Ser. No. 773,141 filed Mar. 1, 1977, and now abandoned.

This invention relates generally to nuclear reactors and, more particularly, to an improved nuclear reactor core assembly for use with a fluid coolant such as liquid metal or gas.

Reactors which operate in the fast neutron spectrum provide certain advantages relative to operation in the thermal neutron spectrum. Among these advantages is that, by employing a blanket of fertile material surrounding the fissionable material in the reactor core assembly, a net gain in fissionable material can be achieved. Thus, the fast reactor design offers the potential of extremely low fuel cost.

Typical fast reactor designs call for a flowing coolant of liquid metal such as liquid sodium or a gas such as carbon dioxide or helium. During full power operation of the reactor core, the pressure drop across the core is maintained relatively high to ensure a relatively high circulation of the fluid coolant for heat removal. During shutdown conditions, such as may prevail after an accident or during refueling, the pressure drop across the core may be substantially lower. During full power operation, less power is produced in the blanket elements than in the fuel element portion of the core assembly. However, because of gamma heating effects in the blanket elements, the decay heat distribution following reactor shutdown shifts significantly. Under these circumstances, relatively more heat is produced in the blanket elements than in the fuel elements, at least during the first few days following reactor shutdown. Thus, proportionately more cooling is required in the blanket elements than in the fuel elements during shutdown conditions.

The cooling requirement in the blanket may be met by providing an appropriate level of overall coolant flow. Hwever, where shutdown flow is handled by an auxiliary circulator or circulators, correspondingly greater capacity must be provided in such circulators, increasing costs. Moreover, the consequent degradation of core outlet temperature requires larger heat transfer area for the auxiliary heat exchangers employed during emergency shutdown. Similar disadvantages occur in connection with the main circulators and heat exchangers during normal shutdown, such as refueling.

For the purpose of increasing the flow through the blanket elements relative to the fuel elements during shutdown conditions, a suitably constructed device with moving parts may be utilized. Such a device, however, may present design difficulties, especially where it must be situated in a region of high temperature and high radiation.

It is an object of the present invention to provide a nuclear reactor core assembly for use with a fluid coolant and having provision for increasing the flow of coolant through the blanket elements relative to the fuel elements during shutdown conditions.

Another more general object of the inventin is to provide an improved fast reactor core assembly.

A further object of the invention is to provide a fast reactor core assembly having means which utilize no moving parts and which increase the coolant flow through the blanket elements relative to the coolant flow through the fuel elements during shutdown conditions.

These and other objects of the invention will become apparent to those skilled in the art from the following description, taken in connection with the accompanying drawings wherein:

FIG. 1, on the same sheet as FIGS. 4-6, is a schematic top view of one form of reactor core assembly which may be constructed in accordance with the invention;

FIG. 2, on the sheet with FIG. 3, is a cross-sectional perspective view of a blanket element used in the core assembly of FIG. 1;

FIG. 3, on the sheet with FIG. 2, is an elevational view, with part broken away, of a blanket element which may be used in the core assembly of FIG. 1 and showing an alternate construction;

Figure 1:
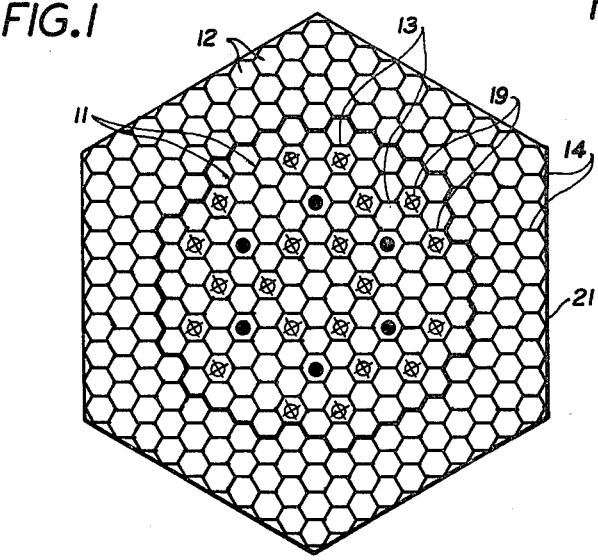

Very generally, the nuclear reactor core assembly of the invention comprises a plurality of fuel elements 11 and a plurality of blanket elements 12 arranged in a core assembly. The fuel elements include first conduit means 13 for directing fluid coolant therethrough. The blanket elements include second conduit means 14 for directing fluid coolant therethrough. The second conduit means has a flow restrictor means 15 therein comprising a plurality of surface roughened elements 16 for limiting flow therethrough. The flow restrictor means has a static configuration such that at full power operation, the coolant flow through the fuel elements is substantially greater than the flow through the blanket elements, and such that at shutdown, the percentage of the total coolant flow through the blanket elements is substantially greater than the percentage of the total coolant flow through the blanket elements at full power operation.

The reactor core described herein is for use in a high temperature gas cooled reactor employing helium as the primary coolant. However, it will be apparent to those skilled in the art that similar considerations within the scope of the invention apply to other types of gas cooled reactors and to liquid metal cooled reactors as well. The reactor in which the core described herein is employed may be housed in a reactor building, not shown, which functions as a secondary containment structure for a prestressed concrete reactor vessel, also not shown. The reactor vessel may be a conventional reinforced concrete cylinder with a top dome and a flat circular base slab. A clearance beneath the prestressed reactor vessel may be provided for refueling purposes. Cavitites in the wall of the prestressed concrete reactor vessel may be provided to contain various cooling loops, circulators, and heat exchangers.

In a high temperature gas cooled reactor of the type described, for example, in U.S. Pat. No. 3,475,272, single stage axial flow compressors may be utilized to provide coolant circulation. The circulation rate is, of course, at a substantially high level during full power operation of the reactor, and is at a lower level during shutdown conditions such as would occur during refueling operation or after an emergency shutdown.

A layout schematic design of a reactor core assembly is shown in FIG. 1. The fuel element section of the core assembly includes a plurality of fuel elements 11 and a plurality of blanket elements 12. Some of the fuel elements are provided with control rod assemblies 19. The blanket elements are arranged in three rows around the fuel elements, and the core assembly assumes a roughly hexagonal shape. A suitable metal liner surrounds the core assembly and is indicated schematically at 21. The fuel elements 11 and the blanket elements 12 are suspended in their position in the core assembly by a supporting grid, not shown, generally as described in the aforementioned U.S. Pat. No. 3,475,272.

Each fuel element is comprised of a plurality of elongated fuel rods, not shown, disposed in a housing which forms a conduit for directing fluid coolant therethrough. The significant structural aspects of the fuel elements are generally the same as those of the blanket elements illustrated in FIGS. 2 and 3.

As may be seen from FIG. 2, the blanket elements each comprise an outer housing 25 forming a conduit through which coolant is circulated over a plurality of tightly packed blanket rods 27 (shown schematically) containing pellets, not shown, of fertile material. The blanket rods are suitably supported within the housing 25 by means, not illustrated, and the housing is shaped to provide a lower orifice 29 and an upper orifice 31. A locking device 33 of suitable construction is provided for securing the blanket element by a lock, not shown, actuated from above the prestressed concrete reactor vessel. The upper portion 35 of the housing 25 is adapted to mate in the unillustrated grid structure to be held firmly in place relative to the other elements. A thermocouple rod 36 extends centrally of the blanket element 12 for temperature monitoring.

During full power operation of a fast reactor, the pressure drop through the blanket elements may be designed at only 25% of the pressure drop through the fuel elements. The extra increment of pressure drop is typically taken in a fixed resistance designed into the blanket element configuration. In the present invention a flow restrictor 15 is used for this purpose. In addition, the flow restrictor 15 serves to provide proportionately more cooling in the blanket elements relative to the fuel elements during the shutdown situation without utilizing any moving parts.

The device of the invention utilizes the principle that the friction factor for a flow through a roughened passage decreases substantially when Reynolds number of flow changes from $4 \times 10^3$ to $2 \times 10^3$. In this connection, reference is made to Shames, I. H., "Mechanics of Fluid", McGraw-Hill Book Company, Inc., New York, 1962, page 257. The core of the invention employs a flow restrictor 15 which may be positioned either at the inlet or outlet end of the conduit 25 of each of the blanket elements. In FIG. 2, the flow restrictor is shown positioned at the inlet end of the conduit 25, whereas in FIG. 3 the flow restrictor is shown positioned near the outlet end of the conduit 25.

Figure 5:
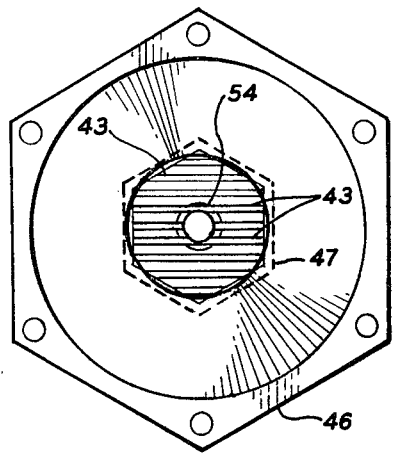
FIG. 5 is a top view of the flow restrictor of FIG. 4.
Figure 4:
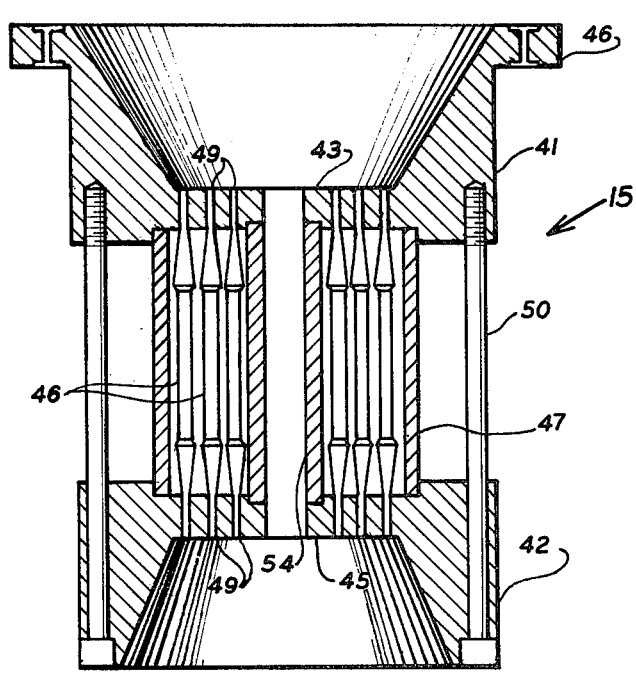
FIG. 4 is a sectional view, enlarged, illustrating the flow restrictor employed in the blanket elements of FIGS. 2 and 3.
Figure 6:
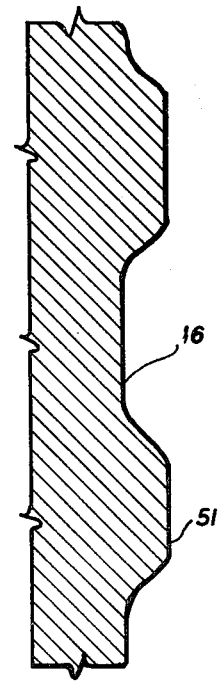
FIG. 6 is a sectional view, greatly enlarged, of a portion of a roughened rod employed in the flow restrictor of FIGS. 4 and 5.

Referring to FIGS. 4, 5 and 6, the flow restrictor 15 is shown comprising upper and lower end pieces 41 and 42, respectively, which support upper and lower transverse grids 43 and 45, respectively. A flange 46 on the upper end piece 41 provides for mounting within the blanket element. A plurality of roughened rods 16 are supported between the grids 43 and 45, each of the rods 16 having suitable connectors 49 extending into the grids. The rods 16 are enclosed by a hexagonal sleeve 47. The end pieces 41 and 42 are tightened against the rods 16 by bolts 50. The exterior surfaces of the rods 16 are roughened by providing a helical ridge 51 (FIG. 6) such as by a standard threading machine. The depth of the threads and the width of the threads and the spaces therebetween are selected to provide the desired roughness as explained below. Each of the rods is supported in the housing 25 parallel with each other and parallel with the direction of flow. The rods are arranged on a triangular pitch, but this is not critical to the invention. The interior of the end pieces are shaped to confine the flow to the regions of the rods. A central tube 54 allows for passage of a support rod, not shown.

In selecting the design parameters of the flow restrictor (that is, the diameter, relative roughness, length, and pitch of the rods) necessary to provide the characteristics of the invention, one must first consider:

1. The pressure drop available across the flow restrictor during normal reactor operation;
2. The space available to accommodate the flow restrictor;
3. The flow through the blanket assembly during normal operation; and,
4. The fraction of normal flow rate at which the maximum effectiveness of the flow restrictor is desired.

Given the above four conditions to start with, the flow restrictor of the invention is so constructed as to provide a static configuration such that, at the normal operation flow rate through the reactor, the friction factor will be relatively high, and such that, at the shutdown condition, the friction factor is lower by an amount sufficient to provide the desired shift in the flow distribution. This shift results in the desired increase in percentage of coolant flow through the blanket elements as compared with the total coolant flow, providing relatively more cooling in the blanket at shutdown.

To do this, the design parameters are selected such taht the Reynolds number of flow through the flow restrictor at the shutdown flow rate is immediately adjacent the Reynolds transition range criterion. In this way, the maximum effectiveness of the flow restrictor is provided, since as may be observed from the previously referred to Shames graph, the friction factor will be lower in this region. By proper selection of the parameters, the percentage flow through the blanket assembly may be substantially increased at the shutdown flow rate over the percentage of flow therethrough during normal operation.

Figure 9:
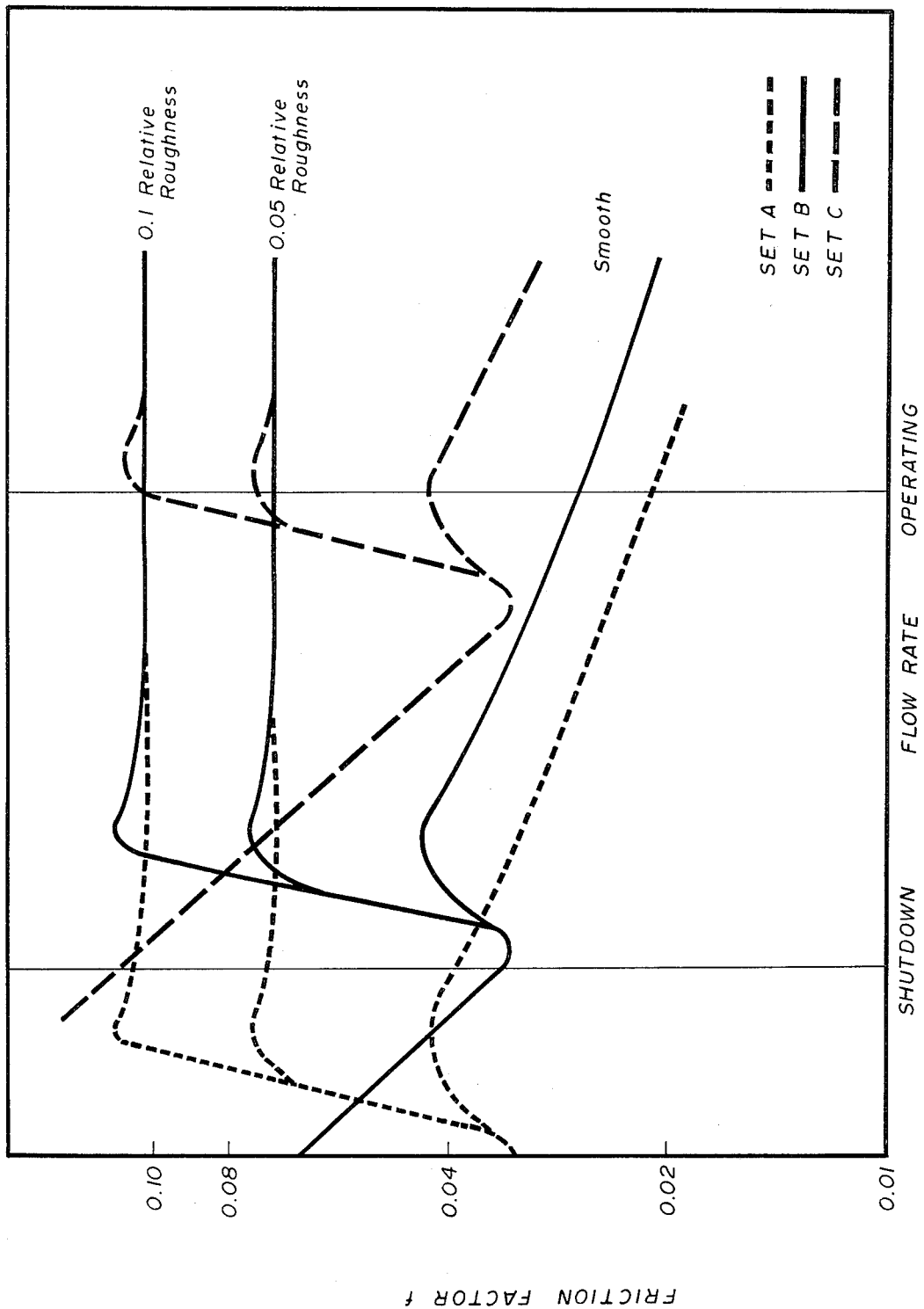
FIG. 9 is a graph illustrating the relationship of flow rate to friction factor for various sets of parameters and for various relative roughnesses of rods.

By referring to FIG. 9, one may observe the importance of selecting the proper combination of parameters to provide the desired position for the Reynolds transition range criterion. FIG. 9 illustrates a graph of flow rate versus the friction factor for three different sets of parameters and for three different rod roughnesses. Given the illustrated shutdown and operating flow rates, it may be seen that the dotted line representing parameter Set A provides a transition range criterion which is too far to the left. Accordingly, the friction factor for all roughnesses is actually higher for the shutdown flow rate than for the operating flow rate. Parameter Set C, represented by the dashed line, is too far to the right in positioning the transition range, also resulting in slightly higher friction factor for the shutdown flow rate than for the operating flow rate.

The solid line of parameter Set B illustrates the desired position of the transition range, represented by the lowest point formed by the solid line curve. It may be seen that for relative roughnesses of 0.05 and 0.1, the friction factor is substantially lower at the shutdown flow rate than it is at the operating flow rate. The effect of relative roughness is significant, and a relative roughness of approximately 0.05 is a practical minimum. Below this, the difference between the friction factor in the turbulent flow region and the friction factor immediately adjacent the transition range at the shutdown flow condition does not provide a large enough difference to be of much advantage.

Referring to FIG. 6, a nomograph is provided representing the relationships between the various foregoing parameters to assist in selecting the dimensions for the elements of the flow restrictor which will place the Reynolds transition range criterion in the proper place, namely, just above the Reynolds number at the shutdown flow rate.

By way of example, the design of a flow restrictor having the necessary static configuration will be described assuming the following starting considerations:

| | |
|---|---|
| 1. Pressure drop available across the flow restrictor during normal operation. | $6.9 \times 10^4$ Pa (10 psi) |
| 2. Space available for flow restrictor: Length | 100.00 mm |
| Desirable rod diameter | 7.4 mm |
| 3. Flow in blanket during normal operation | 1.14 kg/sec (2.5 lbm/sec) |
| 4. Fraction of normal flow rate when flow restrictor to become effective. | 0.04 |

Figure 7:
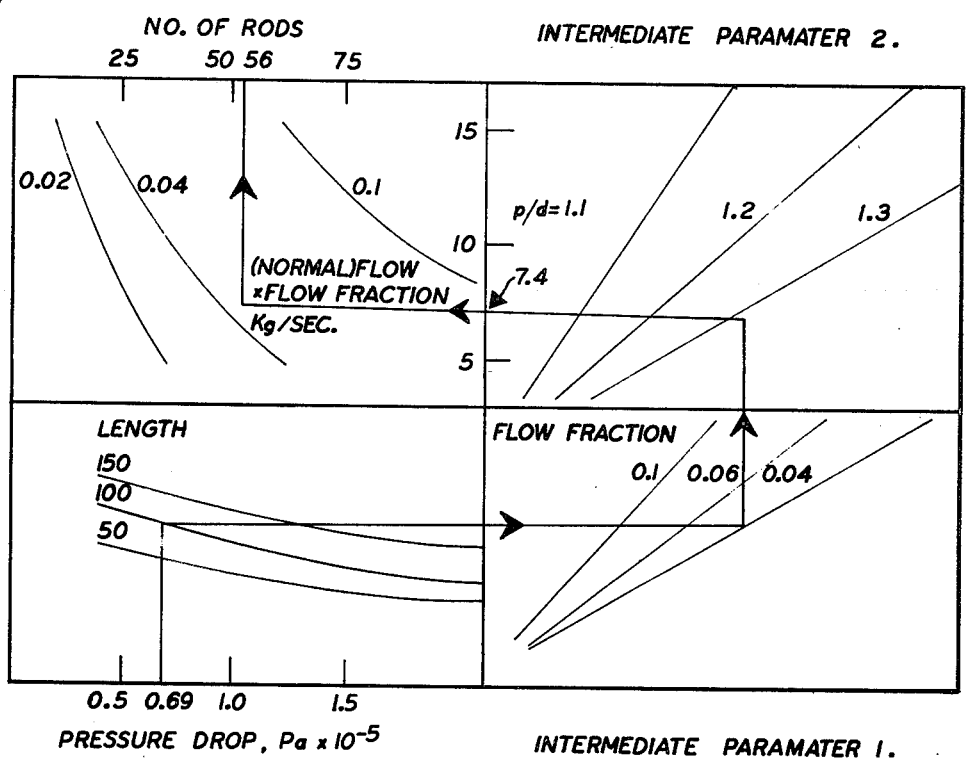
FIG. 7 is a nomograph illustrating the selection of design parameters for constructing a core in accordance with the invention.
Figure 8:
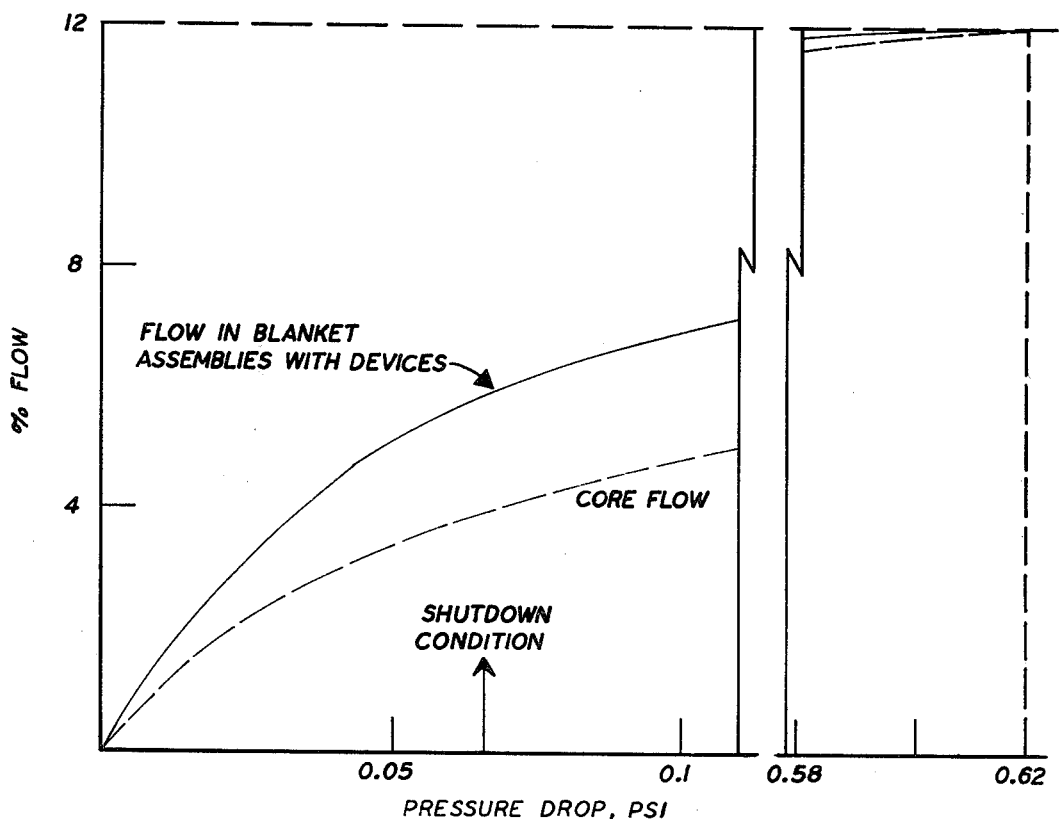
FIG. 8 is a graph illustrating the relationship between pressure drop across the core and the percentage of flow for a reactor core assembly constructed in accordance with the invention.

Referring to FIG. 7, the number of rods and the rod diameter may be determined for the desired operating characteristics. More particularly, in designing the device one begins by determining the pressure drop available across the blanket assembly. This factor is determined by the pressure drop required across the core elements for proper heat transfer and the total available pressure drop consistent with circulator capacity. The additional increment is that which is available for pressure drop across the blanket. Given the above example of starting considerations, one can move from the lower left-hand quarter to the lower right-hand quarter of the FIGURE.

As illustrated for example, a flow fraction of 0.04 or 4% of the total flow of coolant flows through the blanket assembly during normal operation. If this is the case, one moves upwardly to select a pitch to diameter ratio of 1.3 for the rods. This ratio is determined by space considerations within the mechanical configuration of the blanket elements. Moving from there horizontally to the left, the diameter of the rods is determined at 7.4 millimeters. Once again, the flow fraction of 0.04 at that rod diameter yields the total number of rods required to produce the necessary characteristics. The following design results from the example just given:

| | |
|---|---|
| Number of rods | 56 |

| -continued | |
|---|---|
| Pitch to diameter ratio | 1.31 |
| Diameter of the device, mm | 73.0 |
| Roughness size, mm | 0.6 |

Under shutdown conditions, the result will be a flow of 4% of operating flow to the fuel assemblies whereas a flow through the blanket assemblies will be 6% of operating flow.

During transition from turbulent to laminar flow, the friction factor decreases substantially due to the roughened surfaces of the rods 16. This results because small laminar sublayer thicknesses during turbulent flow expose the surface perturbations. As Reynolds number decreases, however, the laminar sublayer thickness increases and finally the effect of roughness on the friction factor disappears. The maximum effectiveness of the flow restrictor will be obtained at or about a Reynolds number of 2,000 through the device itself where the friction factor decreases from 0.103 to 0.032 for a relative roughness of 0.10. Thus, the flow restrictor is designed such that the Reynolds number of flow therethrough at the shutdown flow is just below the transition range criterion (typically about 2000), such that the pressure drop through the flow restrictor during full flow conditions is the desired portion of the total pressure drop, and such that the device may be accommodated in the available space.

It may be seen, therefore, that the invention provides a substantially improved fast nuclear reactor core for use with a fluid coolant, such as a gas or liquid metal. During shutdown flow conditions, more percentage flow results in the blanket than during normal flow without the necessity of moving parts. Deterioration due to reactor radiation or temperature conditions is avoided and ready modification or replacement is possible.

Various modifications of the invention in addition to those shown and described herein will become apparent to those skilled in the art from the foregoing description and accompanying drawings. Such modifications are intended to fall within the scope of the appended claims.

I claim:

1. In a nuclear reactor having a core assembly and a fluid coolant which is circulated at a first flow rate during operation and a second flow rate during shutdown, said first flow rate being substantially higher than said second flow rate, a plurality of fuel elements and a plurality of blanket elements arranged in the core assembly, said fuel elements including first conduit means for directing fluid coolant therethrough, said blanket elements having second conduit means for directing fluid coolant therethrough, said second conduit means having flow restrictor means therein, the improvement wherein said flow restrictor means comprise a plurality of surface roughened elements for limiting flow therethrough, said elements being arranged in a predetermined pitch and having an initial predetermined surface roughness and having a predetermined size, said flow restrictor means having a static configuration wherein the number, pitch, size and roughness of said elements are selected to initially provide a relative roughness of at least about 0.05 and a Reynolds number ($N_{Re}$) at said second flow rate which is less than and immediately adjacent the Reynolds criterion ($N_{Re,C}$), and the Reynolds number at said first flow rate being greater than the Reynolds criterion, whereby the friction factor is substantially lower in said second conduit means at shutdown than at full power operation, whereby at the second flow rate, the percentage of the total coolant flow which flows through said second conduit means is substantially greater than the percentage of the total coolant flow which flows through said second conduit means at said first flow rate.

2. A nuclear reactor core assembly according to claim 1 wherein said second conduit means comprise a plurality of ducts, one for each of said blanket elements, and wherein said flow restrictor means comprise a bundle of surface roughened elements in each of said ducts.

3. A nuclear reactor core assembly according to claim 2 wherein each of said bundles comprises a plurality of rods having a length substantially less than that of said duct, and wherein each of said rods has a helical groove therein for providing a roughened surface.

4. A nuclear reactor core assembly according to claim 2 wherein each of said bundles includes a housing for supporting said rods, said housing being removably secured in said duct.

5. A nuclear reactor core assembly according to claim 1 wherein said flow restrictor means are located proximate the inlet side of said second conduit means.

6. A nuclear reactor core assembly according to claim 1 wherein said flow restrictor means are located proximate the outlet side of said second conduit means.

* * * * *